United States Patent [19]

Henning et al.

[11] 4,142,756
[45] Mar. 6, 1979

[54] ARRANGEMENT FOR CLOSING THE INLET PIPE OF A CONTAINER

[75] Inventors: Bodo Henning, Braunschweig; Heinz Otto; Helmut Krüger, both of Wolfsburg, all of Fed. Rep. of Germany

[73] Assignee: Volkswagenwerk Aktiengesellschaft, Wolfsburg, Fed. Rep. of Germany

[21] Appl. No.: 845,285

[22] Filed: Oct. 25, 1977

[30] Foreign Application Priority Data

Dec. 20, 1976 [DE] Fed. Rep. of Germany ....... 2657747

[51] Int. Cl.² ............................................. B65D 41/04
[52] U.S. Cl. ................... 296/1 C; 220/86 R; 220/288; 220/304; 220/DIG. 33
[58] Field of Search .... 220/86 R, DIG. 32, DIG. 33, 220/256, 257, 288, 304; 280/5 A; 296/1 C

[56] References Cited

U.S. PATENT DOCUMENTS

| 1,774,439 | 8/1930 | Holtson | 220/86 R |
|---|---|---|---|
| 2,068,965 | 1/1937 | Thomas | 220/86 R |
| 2,508,124 | 5/1950 | Stephenson | 220/86 R |
| 2,900,103 | 8/1959 | Taylor et al. | 220/256 |
| 2,908,417 | 10/1959 | Conner et al. | 220/256 |
| 2,992,036 | 7/1961 | Muller | 280/5 A |
| 3,580,414 | 5/1971 | Ginsburgh et al. | 220/86 R |
| 4,055,270 | 10/1977 | Underwood | 220/256 |

FOREIGN PATENT DOCUMENTS

| 204900 | 1/1959 | Austria | 220/86 R |
|---|---|---|---|
| 242593 | 1/1963 | Austria | 220/256 |
| 777507 | 2/1935 | France | 280/5 A |

Primary Examiner—William Price
Assistant Examiner—Allen N. Shoap
Attorney, Agent, or Firm—Brumbaugh, Graves, Donohue & Raymond

[57] ABSTRACT

An arrangement is disclosed for closing the inlet pipe of a container, such as the fuel tank of a motor vehicle. The arrangement includes a cap having a handle portion as well as a fastening and sealing portion. The handle portion is connected to the fastening and sealing portion by a releasable clip connector which becomes disengaged when excessive forces are applied to the handle portion. In addition to or instead of this arrangement, the free end of the inlet pipe and at least the fastening and sealing portion of the cap are surrounded by a protective collar.

9 Claims, 3 Drawing Figures

ARRANGEMENT FOR CLOSING THE INLET PIPE OF A CONTAINER

BACKGROUND OF THE INVENTION

The present invention concerns an arrangement for closing the inlet pipe of a container. This invention may be utilized to advantage with a motor vehicle fuel tank, or in any case where there is a danger, either during normal operation or in exceptional situations such as collisions, that a force will be applied to the cap of the container — in particular against the portion thereof which serves as a handle and projects relatively far beyond the free end of the inlet pipe — in a direction substantially traverse to the axis of the inlet pipe or in the direction of removal of the cap.

In the case of a motor vehicle fuel tank which is the preferred environment for utilization of the present invention, the inlet pipe of the tank terminates at an opening in the vehicle body. In the event of an accident, the regions of the vehicle body surrounding this opening may be pressed against the portion of the cap serving as the handle with such a force as to cause leaks to occur between the cap and the inlet pipe. It is also possible that the inlet pipe itself becomes deformed by these forces applied to the handle portion of the cap so that leaks result and fuel is discharged from the tank.

It is an object of the present invention to provide a closing arrangement for the inlet pipe of a container in which the danger described above is, at least largely, avoided.

SUMMARY OF THE INVENTION

This object, as well as further objects which will become apparent in the discussion that follows, are achieved, according to the present invention, by connecting the handle portion of the cap to the fastening and sealing portion by means of a releasable clip connector which transmits rotational forces but permits the two portions to disengage if excessive forces are applied to the handle portion; that is, such forces as are capable of damaging the fastening and sealing portion or the inlet pipe, resulting in leakage from the container.

As in the case of conventional arrangement for closing the inlet pipe of a container, the invention permits the portion of the cap constituting the handle (hereinafter referred to as the "first portion") as well as the portion serving as the fastening and sealing body - that is, that portion collaborating with the seal and usually provided with a thread or bayonette type closing device (hereinafter referred to as the "second portion" of the cap) - to be constructed in whatever manner may be desirable or necessary to allow proper actuation of the cap by an operator and to achieve a tight seal. However, according to the invention the means of connection between the first and second portions of the cap are made releasable so that the first portion is separated from the second portion and therefore cannot transmit any compressive forces to the second portion and the inlet pipe even when forces in a direction essentially transverse to the inlet pipe axis are applied to the first portion, e.g., by adjacent regions of the motor vehicle body in the event of a collision.

In a preferred embodiment of the invention, the second portion of the cap has a flange-like projection extending, in part, radially outward and the first portion is made of plastic and has a radially inward-directed projection engaged behind the flange-like projection. This arrangement does not exclude the possibility that the cap will also have regions of relatively hard material, such as sheet metal, which, among other things, may form the supporting component of a lock.

Since as a rule the second portion of the cap will project somewhat from the end of the inlet pipe following separation of the first and second portions, it is useful to protect this projecting region of the second portion by providing a protective collar. In a preferred embodiment of the invention this protective collar is fastened to the inlet pipe and either projects into or surrounds the first portion of the cap when the cap is properly in place.

Three preferred embodiments of the present invention are described below in connection with the drawings. These embodiments show the invention in its preferred application; namely, as a closing arrangement for the fuel tank of an automobile.

DESCRIPTION OF THE PREFERRED EMBODIMENTS

Figure 1:
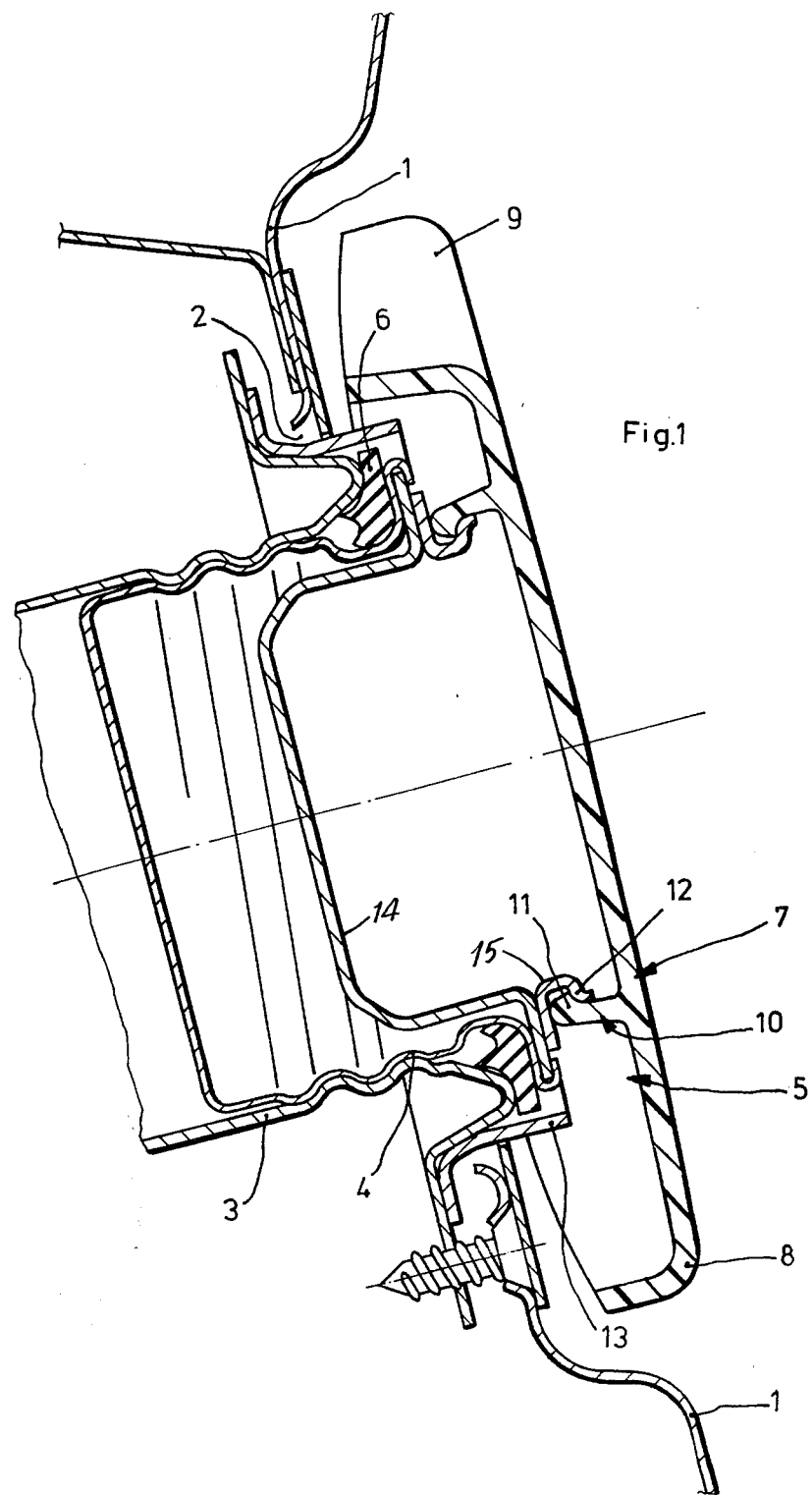
FIG. 1 is a vertical cross-section through the free end region of the inlet pipe of a motor vehicle fuel tank with an associated cap in accordance with a first preferred embodiment of the present invention.

In the closing arrangement shown in FIG. 1 the motor vehicle body 1 forms an opening 2 for passage of the end of an inlet pipe 3 which continues toward the left (in the sense shown in FIG. 1) to a conventional fuel tank (not shown). Into the inlet pipe 3 is screwed the sealing element 4 of a cap 5. The cap, together with a ring seal 6, closes off the tank in a leak-proof manner. As is shown, the maximum width of the sealing element 4 is less than the width of the opening 2.

For actuation, the cap 5 is provided with a handle grip 7 which is designated as the "first portion" of the cap in accordance with the invention. As is shown, the handle grip 7 is wider than the opening 2. The sealing element 4, which may include other attached parts 14 and 15 constitutes the "second" portion.

Practically all closing arrangements in accordance with the invention have this basic structure. The first portion 7 may be in any shape which is easy to manipulate. In the exemplary embodiment shown in FIG. 1, the handle 7 has a flat center region and extensions 8 and 9 projecting radially outward approximately in star shape. The fingers of the operator's hand can be engaged between these extensions when removing or replacing the cap.

In accordance with the invention the connection between the two cap portions 7 and 4 is rendered separable. Towards this end, the first portion 7 consists of a plastic material which is approximately elastically resilient, especially where the walls are thin. Below its center region, the first portion 7 is provided with a projection 10 extending in a direction towards the inlet pipe 3. The projection 10 has at least one region 11 of reduced diameter directed radially inwardly such that it engages behind a flange-like projection 12 extending radially outwardly from the sealing element 4. There may be only one projection 10; however, it is also possible to provide for several tongue-like projections. Moreover, it is possible to have the radial reduced diameter region 11 extend continuously around the entire circumference of the projection 10 or, instead, to provide for several, only local reductions of this kind. In any case, if a collision occurs which leads to a deformation of the motor vehicle body 1 in the area of the opening 2, and a lateral stress is exerted through application of a body portion against the handle 7 or if there is pressure on the handle 7 directed outwardly away from the inlet pipe, the handle 7 will be disconnected from the sealing element 4 so that the handle will not transmit any damaging forces to the sealing element and the inlet pipe.

In order to protect the sealing element 4 which, after separation of the handle 7, in the ideal case remains in the operating position shown and projects somewhat beyond the free end of the inlet pipe 3, the inlet pipe is provided with a protective collar 13.

Figure 2:
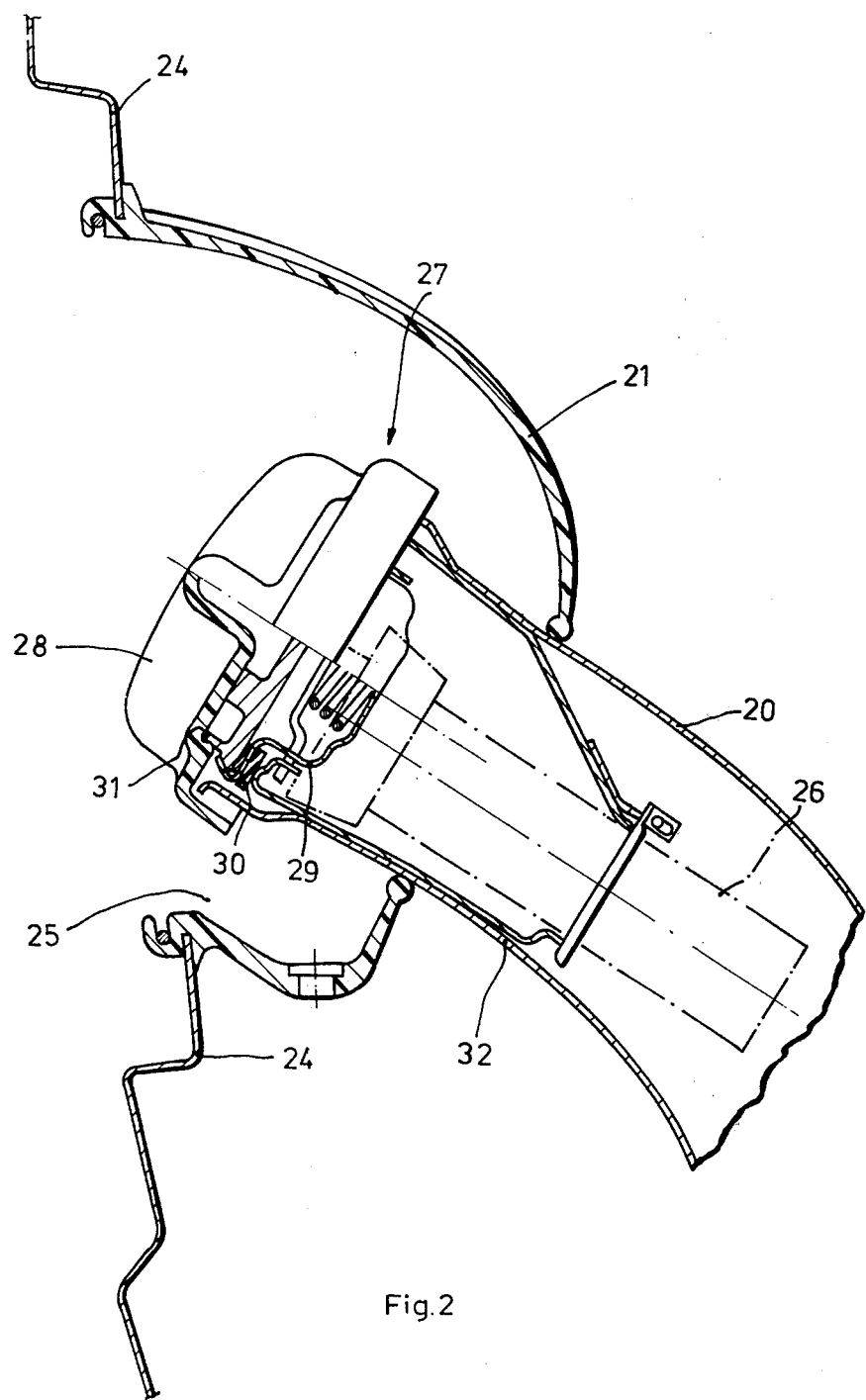
FIG. 2 is a vertical cross-section through the free end region of the inlet pipe of a motor vehicle fuel tank with an associated cap in accordance with a second preferred embodiment of the present invention.

Whereas in the exemplary embodiment illustrated in FIG. 1 the free end of the inlet pipe 3 is rigidly fastened to the vehicle body, FIG. 2 represents a construction in which the inlet pipe 20, which in the figure extends towards the right to a fuel tank (not shown), is held resiliently within an opening 25 in the motor vehicle body 24 by means of the dished holding element 21 made of some elastic or flexible material. In this particular example an element 26 is inserted into the inlet pipe which permits the introduction of only specifically dimensioned (pistol-pipe) hose nozzles as have become standard in the industry, for example for filling motor vehicle tanks with lead-free fuel. This arrangement makes it impossible to insert a differently dimensioned hose nozzle, permitting the introduction of another fuel. These details are mentioned here in order to show that the measures in accordance with the invention in no way influence the remaining structure of the elements of the closing arrangement.

In this embodiment the cap 27 also has two "portions"; namely, a first portion 28 serving as the handle and a second portion 29 which constitutes the sealing element. This sealing element is again supported at the end of the inlet pipe 20 and cooperates with an intermediately placed seal 30.

The connection between the portions 28 and 29 in this case is obtained by hook-like extensions 31 of the sealing element 29 which press themselves into the correspondingly yielding material of the handle 28. As a result, channels are created in the material of the handle 28 which thereby engages behind the hook-shaped diameter enlargements 31 of the second portion 29.

In this example also, in which the cap is held on the inlet pipe by a slide lock, a protective sleeve or collar 32 projects into the space defined by the handle 28.

The protective collar in both exemplary embodiments is placed on the inlet pipe so as to provide reinforcement and stiffening. It may be used to advantage even if the first portion of the cap is not detachably connected with the second portion. In such a case, however, it preferably surrounds the first portion. In this case, if the motor vehicle body is deformed it cannot then press against the cap; rather, it will directly contact the protective collar and thus act on the inlet pipe. As a result, the damage to the body will not deleteriously affect the seal between the inlet pipe and cap.

Figure 3:
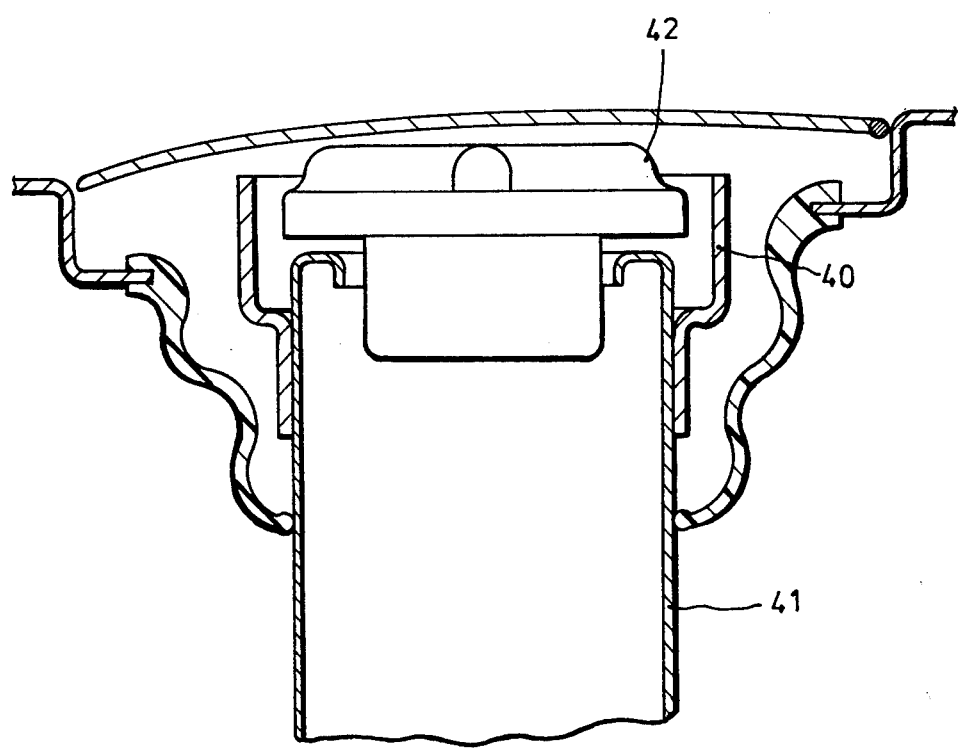
FIG. 3 is a vertical cross-section through the free end region of the inlet pipe of a fuel tank with an associated cap in accordance with a third preferred embodiment of the present invention.

An embodiment of this latter arrangement is shown in FIG. 3. In this case, a protective collar 40 sits on the inlet pipe 41 and surrounds the cap 42. Because of this protection the first portion of the cap may be rigidly connected with the second portion in a conventional manner.

While there have been described what are believed to be the preferred embodiments of the invention, those skilled in the art will recognize that various changes and modifications may be made to these embodiments without departing from the spirit of the invention, and it is intended to claim all such embodiments as fall within the true scope of the invention.

We claim:

1. In a motor vehicle comprising a vehicle body having a body opening and a fuel inlet pipe having an end thereof extending through said body opening for supplying fuel to a fuel tank arranged within said body; the improvement comprising a cap for closing said end of said fuel inlet pipe, said cap including:
    (a) handle means constituting a first portion of said cap and having external dimensions which are wider than said body opening;
    (b) fastening and sealing means constituting a second portion of said cap and having no external dimensions which are wider than said body opening;
    (c) releasable means, for connecting said first portion of said second portion of the cap in a manner permitting transmission of rotational forces and causing disengagement of said first portion from said second portion upon application to said first portion by said vehicle body of lateral forces, and forces directed outwardly away from said fuel inlet pipe, as are capable of damaging said second portion or said inlet pipe, resulting in leakage from the fuel tank.

2. The inlet pipe closing arrangement defined in claim 1, wherein said second portion has a flange-like projection extending radially outward, in part, and wherein said first portion is made of plastic and has a radially inward-directed projection engaged behind said flange-like projection.

3. The inlet pipe closing arrangement defined in claim 1, wherein said second portion extends substantially concentrically with the inlet pipe when said cap is in place, the improvement further comprising a protective collar associated with said inlet pipe and surrounding the free end of said inlet pipe and said second portion when the cap is in place.

4. The inlet pipe closing arrangement defined in claim 3, wherein said protective collar sits on said inlet pipe.

5. The inlet pipe closing arrangement defined in claim 3, wherein said protective collar projects into the space defined by said first portion.

6. The inlet pipe closing arrangement defined in claim 3, wherein said protective collar surrounds said first portion.

7. The inlet pipe closing arrangement defined in claim 1, wherein said second portion extends substantially concentrically with the inlet pipe when said cap is in place, and further comprising a protective collar associated with said inlet pipe and surrounding a free-end of said inlet pipe and said second portion when the cap is in place.

8. The inlet pipe closing arrangement defined in claim 7, wherein said protective collar sits on said inlet pipe.

9. The inlet pipe closing arrangement defined in claim 7, wherein said protective collar surrounds said first portion.

* * * * *